United States Patent
Chowdhary et al.

(10) Patent No.: US 9,163,946 B2
(45) Date of Patent: Oct. 20, 2015

(54) METHODS AND APPLICATIONS FOR MOTION MODE DETECTION FOR PERSONAL NAVIGATION SYSTEMS

(75) Inventors: Mahesh Chowdhary, San Jose, CA (US); Arun Kumar, Delhi (IN); Manish Sharma, Noida (IN); Kolin Paul, Delhi (IN); Mahaveer Jain, Rajasthan (IN); Gagan Narula, Ghaziabad (IN)

(73) Assignee: CSR TECHNOLOGY HOLDINGS INC., San Jose, CA (US)

(*) Notice: Subject to any disclaimer, the term of this patent is extended or adjusted under 35 U.S.C. 154(b) by 1615 days.

(21) Appl. No.: 12/510,965

(22) Filed: Jul. 28, 2009

(65) Prior Publication Data

US 2011/0029277 A1 Feb. 3, 2011

(51) Int. Cl.
*G01C 17/00* (2006.01)
*G01C 21/16* (2006.01)
*G01C 21/20* (2006.01)

(52) U.S. Cl.
CPC .............. *G01C 21/165* (2013.01); *G01C 21/20* (2013.01)

(58) Field of Classification Search
CPC ......... G01B 7/003; G01B 5/004; G01B 7/004
USPC ................. 702/150, 189; 701/214, 216, 220; 73/512
See application file for complete search history.

(56) References Cited

U.S. PATENT DOCUMENTS

| 7,386,395 B1* | 6/2008 | Masson .......................... 701/220 |
| 2006/0176174 A1* | 8/2006 | Gollu et al. ............... 340/539.13 |
| 2010/0171628 A1* | 7/2010 | Stansfield ..................... 340/669 |

* cited by examiner

*Primary Examiner* — Elias Desta

(57) ABSTRACT

A method and apparatus of detecting and using motion modes in a mobile device is described. Movement data is collected from an inertial motion unit (IMU) of the mobile device and compared to two or more sets of training data, each set of training data corresponding to a different motion mode. Then, a motion mode is determined to be the current mode of the mobile device on the results of the comparison. The motion mode is used by the mobile device in a variety of applications.

27 Claims, 5 Drawing Sheets

METHODS AND APPLICATIONS FOR MOTION MODE DETECTION FOR PERSONAL NAVIGATION SYSTEMS

FIELD OF THE INVENTION

The present invention is related to location positioning systems, and more particularly, to a method and apparatus of detecting and using motion modes in a mobile device.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS", also known as NAVSTAR, have become commonplace. Other examples of SPS systems include, but are not limited to, the United State ("U.S.") Navy Navigation Satellite System ("NNSS")(also known as TRANSIT), LORAN, Shoran, Decca, TACAN, NAVSTAR, the Russian counterpart to NAVSTAR known as the Global Navigation Satellite System ("GLONASS") and any future Western European SPS such as the proposed "Galileo" program. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time (i.e. navigation solution).

GPS and other satellite based navigational systems have some limitations such as the availability of a sufficient number of satellite signals. Satellite signals are sometimes not available in deep canyons, in areas with large number of buildings blocking the direct satellite signals, and in dense forest areas. In addition to this, the satellite signals can be completely blocked or greatly attenuated inside buildings. To reduce these errors, inertial measurement units (IMUs) equipped with microelectromechanical systems (MEMS) sensors can be integrated with a personal navigation device (PND) to provide data that is used to improve the position availability and reliability of the PND in degraded signal environments. For example, in an indoor environment where satellite signals are not available or a dense urban environment where multipath errors are common, MEMS sensor data can aid in the calculation of a navigation solution. IMUs include gyroscopes that measure changes in direction, accelerometers that estimate acceleration, magnetic sensors that can detect changes in the orientation of a device, and a host of other similar devices.

More particularly, after the position of a PND is initially determined, the IMUs allow the position of the PND to be determined as the PND moves, even if the satellite signals are blocked. The determination of a position by propagating a previous known position based on movement data (e.g., data provided by an IMU) is known as dead reckoning (DR), or inertial navigation. Currently, DR methods do not take into account how the PND is moving other than detecting changes in velocity, acceleration or heading.

SUMMARY OF THE INVENTION

The present invention is related to location positioning systems, and more particularly, to a method and apparatus of detecting and using motion modes in a mobile device. According to one aspect, movement data is collected from an inertial motion unit (IMU) of the mobile device and compared to two or more sets of training data, each set of training data corresponding to a different motion mode. Then, a motion mode is determined to be the current mode of the mobile device on the results of the comparison.

In furtherance of this aspect, in some embodiments a set of linear predictor coefficients (LPC) is computed for the collected motion data and compared to the LPC for the two or more sets of training data. The comparison includes calculations of spectral distortion values, and the current mode of the mobile device is determined to be the motion mode whose LPC data has the least amount of spectral distortion with respect to the LPC of the collected motion data. Alternatively, the LPC of the collected movement data is converted to linear spectral frequencies (LSF), and these LSF are compared to LSFs for the two or more sets of training data. The comparison similarly includes calculations of spectral distortion values, and the current mode of the mobile device is determined to be the motion mode whose LSF has the least amount of spectral distortion with respect to the LSF of the collected motion data.

According to another aspect, an absolute difference is computed, the absolute difference being the difference between a maximum value and a minimum value of the collected movement data within a certain window. The absolute difference is compared to one or more threshold values, and based on the results of the comparison, a motion mode is determined to be the current motion mode. The threshold values and associated motion modes are predetermined based on training data.

According to yet another aspect, a motion mode determined using absolute differences is compared to a motion mode determined using LPC values, and an alert may be raised if the two are difference.

According to one aspect, the current motion mode, once determined, may be used by the mobile device in a variety of applications. For example, upon determining that the mobile device is stationary, the mobile device may power off.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting, rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
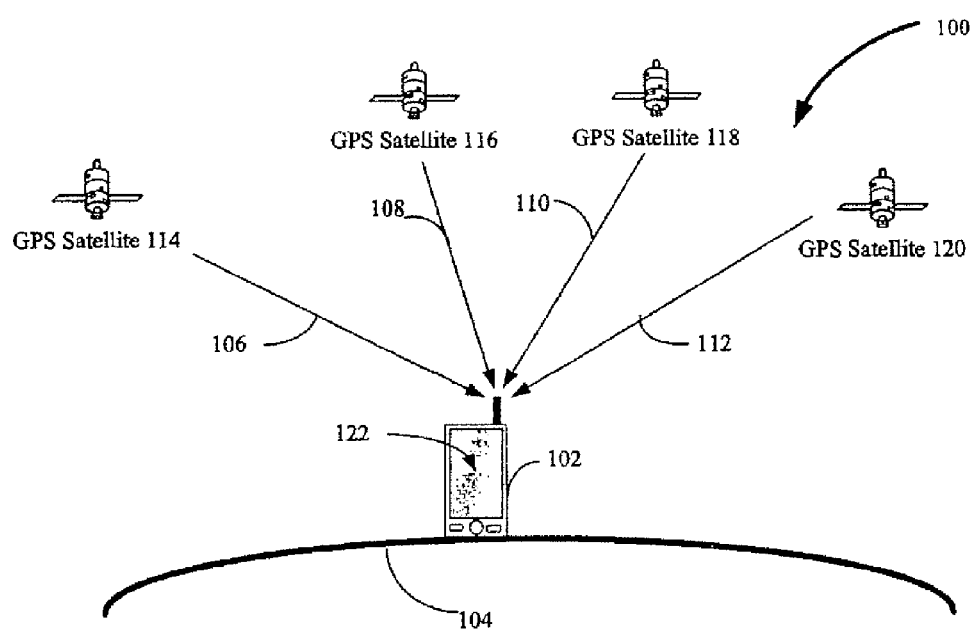
FIG. 1 is a block diagram of an example implementation of principles of the invention.

FIG. 1 illustrates an example implementation of embodiments of the invention. As shown in FIG. 1, GPS satellites (i.e. SVs) 114, 116, 118 and 120 broadcast signals 106, 108, 110 and 112, respectively, that are received by GPS device 102, which is located at a user position somewhere relatively near the surface 104 of earth.

GPS device 102 can be a handheld/portable personal navigation device (PND, e.g., PNDs available from Garmin, TomTom, etc.) or a cell phone, iPhone, PDA, handheld or laptop computer, or other type of device with built-in GPS functionality, or any GPS device embedded in tracking applications (e.g., automotive tracking from Trimble, package or fleet management tracking from FedEx, child locator tracking applications, etc.). Such GPS functionality can be implemented by chipsets such as SiRFStar and other chipsets from SiRF Technology, Inc., for example, which include core processors and embedded storage and software for processing received GPS/SPS signals and/or determining a navigation solution based on the received and processed signals.

As will become more apparent from the descriptions below, GPS device 102 according to aspects of the invention also includes sensors such as accelerometers, pressure sensors, gyroscopes and the like (collectively, inertial measurement unit or IMU). GPS device 102 also includes DR functionality, as adapted with the functionality of the present invention. Example sensors and functionality that can be adapted for use in the present invention are described in more detail in co-pending applications Nos. 11/823,964 and 12/471,147, commonly owned by the present assignee, the contents of which are incorporated by reference herein in their entirety. Those skilled in the art will be able to understand how to adapt the apparatuses and functionality depicted in those applications for use with the techniques of the present invention, and so further details thereof will be omitted here for sake of clarity of the invention.

Signals 106, 108, 110 and 112 are well-known GPS signals in which three binary codes shift the satellite's transmitted L1 and/or L2 frequency carrier phase. As is known, signals from at least four SVs are usually needed before device 102 can provide a 3-dimensional navigation solution (only three satellites are required for a 2-dimensional navigation solution; e.g., by using known altitude).

Figure 2:
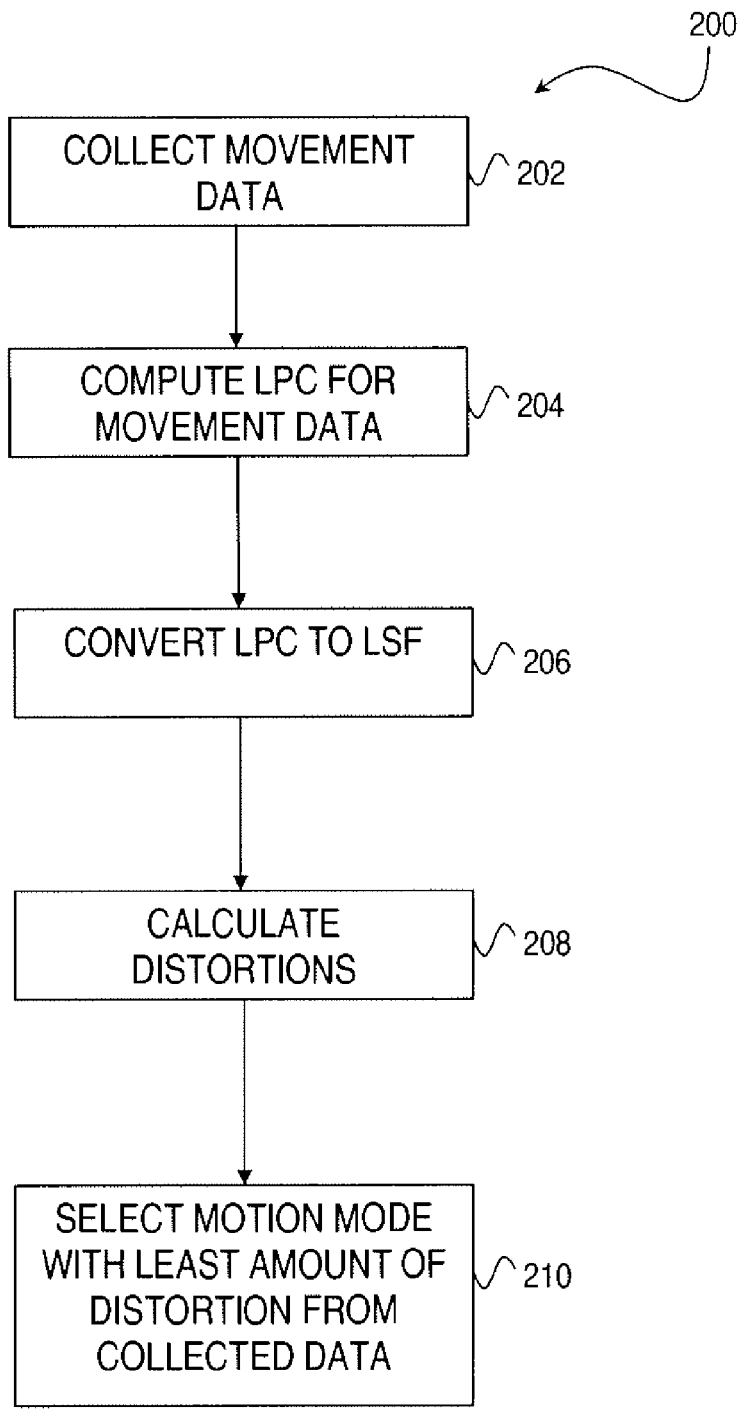
FIG. 2 is a block diagram illustrating exemplary steps according to one aspect of the invention.

According to one aspect of the invention, a frequency-domain method is employed to detect a motion mode of a PND device based on movement data from an IMU of the PND device. A motion mode indicates how the PND device is moving Since a PND is typically carried by a human user, examples of motion modes include: stationary, walking, fast walking, jogging, climbing up/down stairs, going up/down on an escalator, going up/down on an elevator, biking, driving, riding in a vehicle such as a car, bus, boat, airplane, etc. FIG. 2 illustrates a flow chart 200 that illustrates exemplary steps for performing a method to determine a motion mode, according to embodiments of the invention.

First, movement data is collected from the IMU of the PND device (step 202). This movement data may be, for example, acceleration data from an accelerometer. Alternatively, the movement data may be angular rate from a gyroscope, altitude variation data from a pressure sensor, or heading, pitch, and roll angles from a combination of magnetic sensor and accelerometer. Next, linear prediction coefficients (LPC) are generated for the collected movement data (step 204). A periodic signal, such as the movement data collected by an IMU unit that represents near-periodic signals such as walking, fast walking, jogging, etc., can be approximated by a linear combination of the signal's past p sample values.

$$x(n) = a_1 x(n-1) + a_2 x(n-2) + \ldots + a_p x(n-p) + e(n)$$

$$= \sum_{1}^{i=p} a_i x(n-i) + e(n)$$

where the coefficients $a_1, a_2, \ldots, a_p$ are the linear prediction coefficients (LPC) and e(n) is the approximation error at time n.

A linear predictor with prediction coefficients $b_k$ is a prediction system whose output X(n), is an estimation of the data x(n). X(n) is estimated based on previous values of x (e.g., x(n−1), x(n−2), etc.). The linear predictor may be an autoregressive (AR) model.

$$X(n) = b_1 x(n-1) + b_2 x(n-2) + \ldots + b_p x(n-p)$$

$$= \sum_{1}^{k=p} b_k x(n-k)$$

The prediction error, e(n), is the approximation error at time n, and is the difference between x(n) and X(n):

$$e(n) = x(n) - X(n)$$

By minimizing the square sum of the prediction error, a unique set of linear-prediction coefficients (LPC) may be obtained. Also, once the order of the AR model has been determined, the AR coefficients $a_1, a_2, \ldots, a_p$ may be estimated by an auto-correlation method known as the Yule-Walker equations:

$$\begin{bmatrix} r_x(0) & r_x(1) & \ldots & r_x(p) \\ r_x(1) & r_x(0) & \ldots & r_x(p-1) \\ r_x(2) & r_x(1) & \ldots & r_x(p-2) \\ \ldots & \ldots & \ldots & \ldots \\ r_x(p) & r_x(p-1) & \ldots & r_x(0) \end{bmatrix} \begin{bmatrix} 1 \\ a_1 \\ a_2 \\ \ldots \\ a_p \end{bmatrix} = \begin{bmatrix} \sigma^2 \\ 0 \\ 0 \\ \ldots \\ 0 \end{bmatrix}$$

where $$r_x(k) = \sum_{n=0}^{n-1-k} X(n)X(n+k)$$

In the frequency domain, the transfer function of the AR model is:

$$H(z) = \frac{G}{1 - \sum_{k=1}^{P} b_k z^{-1}}$$

Based on this transfer function, the LPC may be converted into line spectral frequencies (LSF) as follows. First, $H(z)$ may be represented as the sum of an even symmetric and an odd symmetric filter, $P(z)$ and $Q(z)$, such that:

$$H(z) = \frac{P(z) + Q(z)}{2}$$

where $$P(z) = 1 - (a_1 + a_N)z^{-1} - \ldots - (a_1 + a_N)z^{-N} + z^{-(N+1)}$$

$$Q(z) = 1 - (a_1 - a_N)z^{-1} - \ldots - (a_1 - a_N)z^{-N} + z^{-(N+1)}$$

$P(z)$ and $Q(z)$ have roots at $z=1$ and $z=-1$, respectively, so $P(z)$ and $Q(z)$ can be written as:

$$P(z) = \frac{P(z)}{(1+z)}$$
$$= (p_0)z^N + (p_1)z^{N-1} + \ldots + (p_k)z^{N-k} + \ldots (p_N)$$

$$Q(z) = \frac{Q(z)}{(1-z)}$$
$$= (q_0)z^N + (q_1)z^{N-1} + \ldots + (q_k)z^{N-k} + \ldots (q_N)$$

where $p_0 = 1 q_0 = 1$ $p_k = -(a_k + a_{N+k-1}) - p_{k-1}$ for $k=1, 2, \ldots, N$ $q_k = (-a_k + a_{N+k-1}) + q_{k-1}$ for $k=1, 2, \ldots, N$ The roots of the two equations immediately above are the line spectral frequencies (LSF).

Once the LSF is obtained, the LSF is compared to the LSF of previously obtained training motion data for the various motion modes and a spectral distortion ($D_{sp}$) value is computed for the LSF from the collected motion data and the training LSF for each of the various motion modes (step 208). The spectral distortion ($D_{sp}$) value is computed based on the following:

$$D_{sp} = \frac{1}{2\pi} \int_{-\pi}^{\pi} (10\log_{10} S(w) - 10\log_{10} S_t(w))^2 \, dw$$

where $S(w)$ is the spectral representation of the collected motion data and $S_t(w)$ is the spectral representation of training motion data for a particular motion mode.

Figure 3:
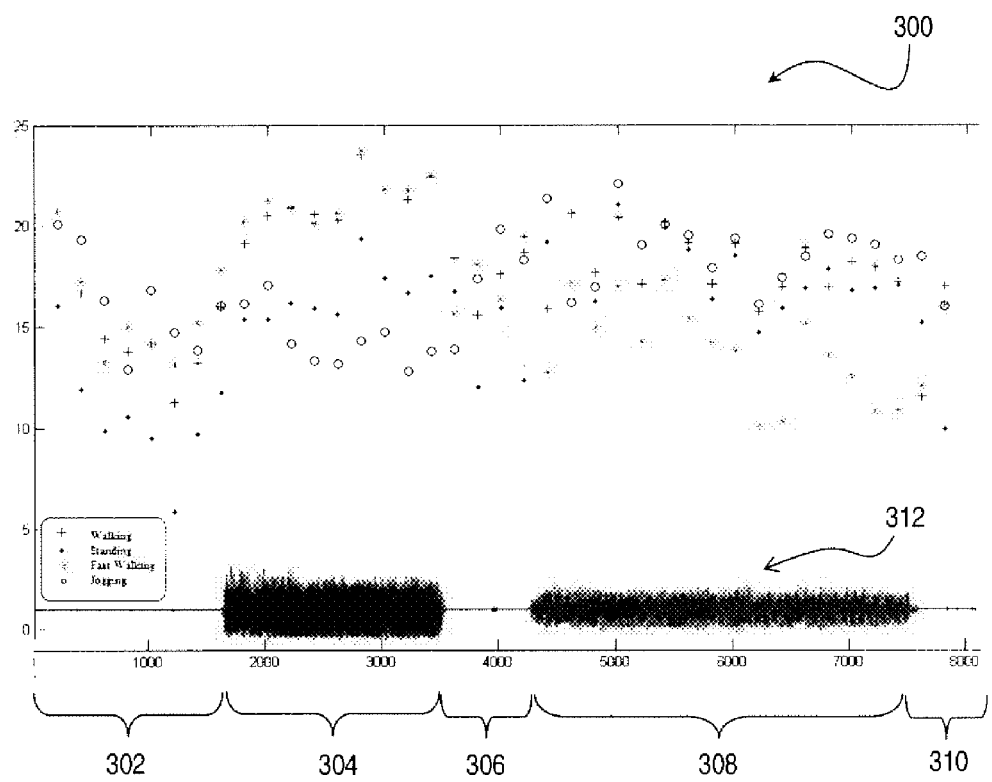
FIG. 3 is a graph illustrating spectral distortion values for different types of movement.

Once the spectral distortion values are obtained for each of the various motion modes, one of the various motion modes is selected to be the motion mode that best matches the motion indicated by the collected motion data (step 210). The selected motion mode is one containing the least amount of spectral distortion relative to the collected motion data. Chart 300 in FIG. 3 depicts spectral distortions for various motion modes (i.e., walking, standing, fast walking, and jogging) over a period of time, when a user of a PND transitions from standing to jogging to standing and then to fast walking, and finally back to standing. Signal 312 depicts corresponding collected acceleration data. In time period 302, the user is standing, and the motion mode that has the least amount of spectral distortion is that of the standing motion mode. In time period 304, when the user is jogging (as indicated by the large amplitudes in signal 312), the motion mode that has the least amount of spectral distortion is that of the jogging motion mode. Similarly, in time period 306, when the user is stationary again, the standing motion mode exhibits the least amount of spectral distortion. In time period 308, when the user is walking quickly, the fast walking motion mode exhibits the least amount of spectral distortion. Finally, in time period 310, when the user is stationary again, the standing motion mode exhibits the least amount of spectral distortion.

According to one embodiment of the invention, the training data for the various motion modes used for comparison with newly collected motion data is collected for several users with varying heights and stride lengths. In one example, 300 sets of data are collected for four different users. To obtain a single set of LSF for many sets of data, a centroid is computed for the LSFs of the many sets of data. A centroid is the center of a frequency response, and is not equal to the mean of all frequency responses. The centroidal LSF is then used as a basis for comparison with the LSF of newly collected motion data for the purpose of determining a motion mode for the newly collected motion data. In other words, to determine a motion mode for newly collected motion data, the LSF of the newly collected motion data is compared to a single set of centroidal LSF for each of the various motion modes, where each set of centroidal LSF is the centroid of multiple sets of LSF computed for training data for a particular motion mode.

In another embodiment, after the centroidal LSF has been computed for a particular motion mode, the centroidal LSF is reconverted back to LPC data. In this embodiment, the LPC of newly collected motion data may be directly compared to the reconverted LPC for a particular motion mode for purposes of comparison and determination of motion mode for the newly collected motion data. This approach has the advantage of not needing to compute LSF for newly collected motion data, as is depicted and explained in connection with the flowchart of FIG. 2, and so the process steps shown in FIG. 2 should not be considered limiting.

According to one embodiment, the order of the AR model is obtained by evaluating the auto-correlation of the prediction error. An AR model with an order of p entails that the estimate is a sequence that is a linear combination of the past p values. When the order p is too low, a smoothed spectrum estimation results. When the order is too high, spurious peaks in the spectrum and statistical instability results. For a perfect predictor, the error between the observed signal and the predicted signal is completely uncorrelated. As such, if there is a correlation between the predicted signal and the observed signal, then it may be determined that the predicted signal is not accurate enough and that the order of the AR model needs to be increased further to remove the correlation in the prediction error and also to reduce the mean square error.

According to one embodiment, the window size of the AR model is 200 samples when the data sampling rate is 30 Hz. The window size may span a few time periods of the motion so as to model its periodic nature accurately:

According to one embodiment, the window size of the AR model used is 30 when the data sampling rate is 30 Hz. The model order may be sufficiently high so as to model the correlation structure of the data accurately, while at the same time, the model order should be sufficiently small compared to the window size to avoid data sparsity problems in AR coefficient estimation.

Figure 4:
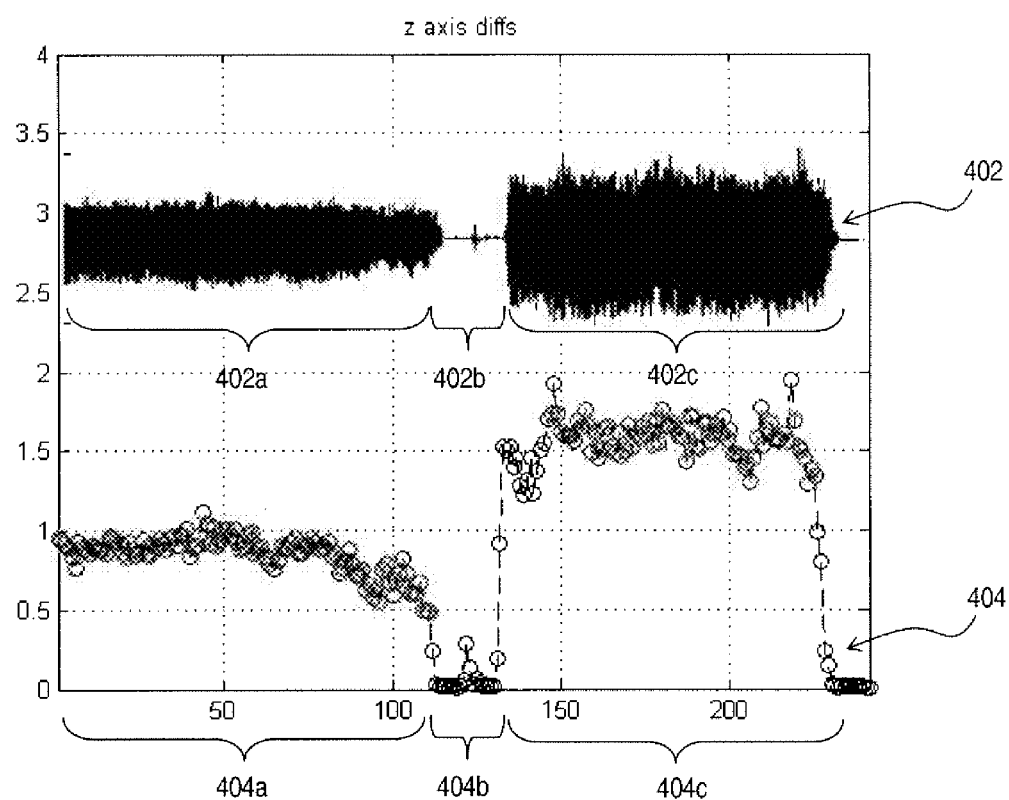
FIG. 4 is a graph illustrating absolute difference values for different types of movement.

According to another aspect of the invention, a time-domain method is employed to detect a motion mode of a PND device based on movement data from an IMU of the PND device. More specifically, movement data is analyzed and then used to classify an in-progress motion of a PND into one of several motion modes. FIG. 4 illustrates graph 500, which includes plot 402 and plot 404. Plot 402 represents in-progress data from an accelerometer that measures the acceleration in the "z" axis plotted against time. Plot 402 can be viewed to include three sub-sections: sub-section 402a, sub-section 402b, and sub-section 403c. In the time of sub-section 402a, a user carrying the PND was walking. Then, in the time of sub-section 402b, the user stopped and became stationary. Finally, in the time of sub-section 402c, the user was jogging. As illustrated in FIG. 4, the spread of acceleration data is highest in the sub-section where the motion was a jogging motion (i.e. subsection 402c), lower in the sub-section where the motion was a walking motion (i.e. subsection 402a), and nearly zero in the sub-section where the motion was stationary (i.e. subsection 402b). In other words, as the velocity of motion of a PND (and of the user who is carrying the PND) increases, the magnitude of the resultant Ground Reaction Force (GRF) in the "z" axis captured by the accelerometer also increases.

Figure 5:
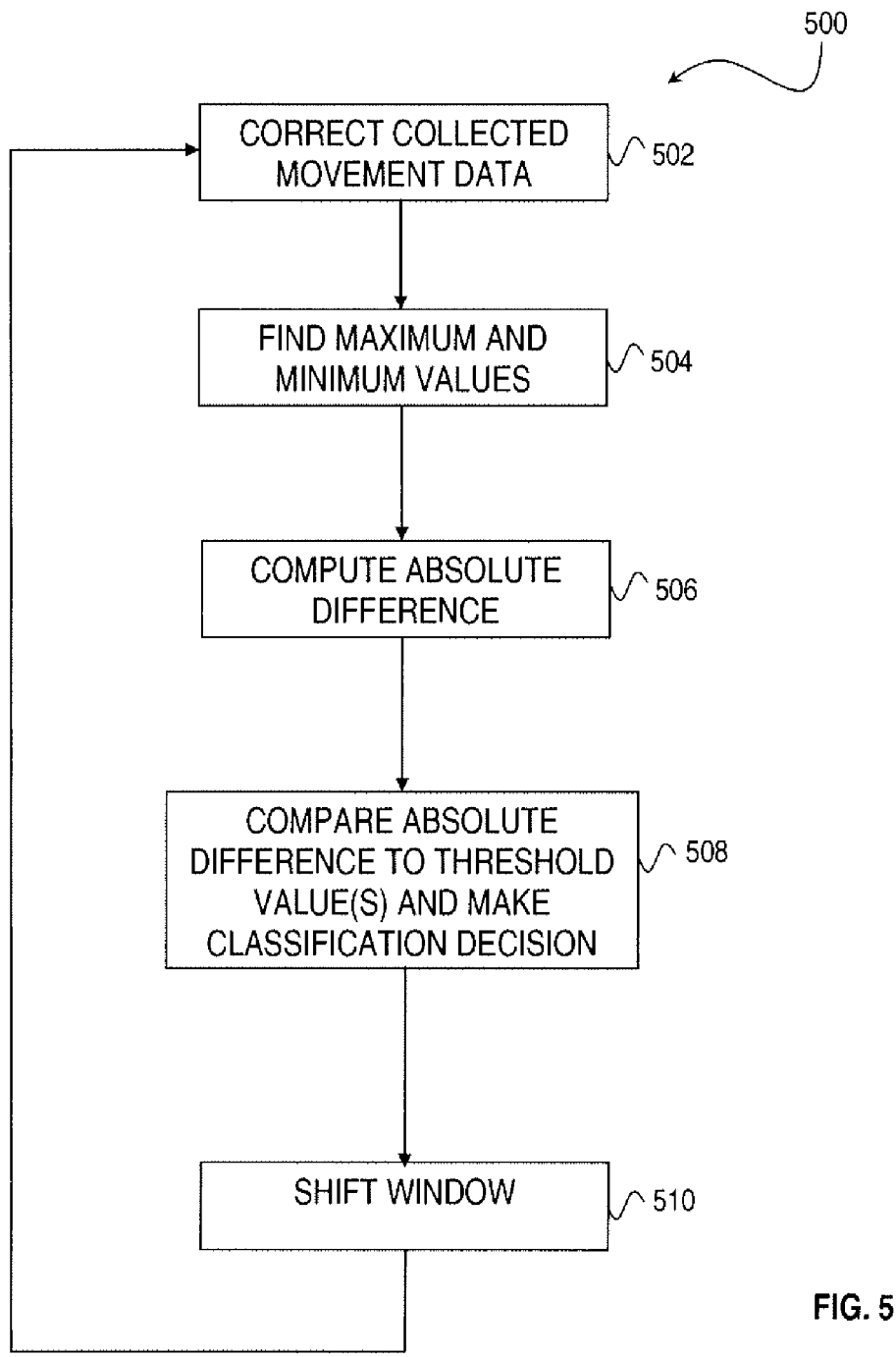
FIG. 5 is a block diagram illustrating exemplary steps according to one aspect of the invention.

FIG. 5 illustrates a flowchart 500 that includes exemplary steps for using the movement data from an IMU (e.g., an accelerometer) to classify the in-progress motion. First, in step 502, the movement data is corrected to remove any static misalignment. Also in this step, the "z" axis for the IMU is determined based on an orthogonalized sensor module. Next, in step 504, the minimum and maximum values for the corrected movement data within a one-second window are found. Although one second is employed as the window width in this example, it should be apparent to those skilled in the art that another window width may also be employed. Then, in step 506, the absolute difference between the minimum value and the maximum value is determined. The absolute difference is used to make a classification decision by comparing the absolute difference to predetermined threshold values (step 508).

For example, the threshold values, pre-determined based on training data, may define the following ranges: (1) absolute difference <0.3; (2) 0.3<absolute difference <1; (3) 1<absolute difference <2.3; and (4) absolute difference >2.3, where an absolute difference in range (1) indicates a stationary motion mode, an absolute difference in range (2) indicates a normal walking motion mode, an absolute difference in range (3) indicates fast walking motion mode, and an absolute difference in range (4) indicates a jogging motion mode.

Plot 404 in FIG. 4 depicts the absolute difference values that correspond to plot 402. Accordingly, sub-sections 404a, 404b, and 404c also correspond to sub-sections 402a, 402b, and 402c, respectively. In sub-section 404a, the absolute difference value is around 1. This would result in a classification of normal walking. In sub-section 404b, the absolute difference value is around zero, resulting in a classification of being stationary. In sub-section 404c, the absolute difference value is around 1.5, resulting in a classification of fast walking.

Finally, in step 510, the time window is shifted and steps 502, 504, 506, and 508 are repeated for the next time window. Although the amount of shift in the time window may be 1 second or any other value.

In addition, the parameters of Euclidean norm of acceleration and variance of acceleration data may be used, alone or in combination, with the predetermined thresholds described above to further improve the accuracy of classification.

The Euclidean norm of the acceleration signal from a 3-axis accelerometer is described by the following expression:

$$A_n = \sqrt{A_x^2 + A_y^2 + A_z^2}$$

where $A_x$, $A_y$, and $A_z$ are the accelerations measured along the three orthogonal axes using a 3-axis accelerometer. An advantage of using the Euclidean norm of acceleration signal in the absolute difference method described above is that the user mode detection test may be conducted even when the device is in an arbitrary orientation. This is particularly useful for devices such as mobile handsets which can be carried by the user in arbitrary orientations.

The performance of the absolute difference method described above can also be enhanced by use of variance on the acceleration signal. A test to compare the absolute difference with a set of pre-determined threshold values can be combined with comparing the variance on the acceleration signal within the detection window with pre-determined threshold values for the variance. The variance of signal corresponds to the signal's noise power.

It should be apparent to persons skilled in the art that the Euclidean norm of acceleration signal and the variance on the acceleration signal may also be employed to process data in the frequency-domain method described above.

According to yet another aspect of the invention, the frequency-domain method and the time-domain methods may be used in a complementary manner to detect motion modes. For example, the time-domain method may be used to produce a first estimate, because the time-domain method needs only a small amount of data (e.g., a half-second worth of motion data) to produce an estimate. The frequency-domain method generally needs a larger amount of data (e.g., 2 to 3 seconds worth of motion data), but is typically more accurate over a longer span of time. In one embodiment, the results produced by the frequency-domain method are used to monitor the results produced by the time-domain method. In other words, the frequency-domain method may be used to check the motion mode classifications that result from using the time-domain method.

According to one aspect of the invention, the motion modes determined according to the methods described above may be used in a variety of applications. In one embodiment, a motion mode may be used to select an appropriate position determination algorithm for DR purposes, thereby increasing the accuracy of the positions computed by the DR algorithm. For example, when a user carrying a PND drives into a parking garage and begins to walk into an indoor environment, satellite signals will become unavailable and DR algorithms must be relied on to continue to produce position estimates.

With a motion mode available, an appropriate DR algorithm (e.g., one catered to pedestrian walking) may be selected to produce better position estimates. The motion mode classification may change from "driving" to "walking" upon detecting, using the methods discussed above, upon the user's stopping the car and commencement of walking. In addition, waypoints for the walking session may be continuously stored so that when the user desires to return to the location of the parked vehicle, the waypoints can be used to guide the user back.

In another embodiment, motion mode detection may be used to improve pedestrian DR algorithms. Pedestrian algorithms have four components: (1) step diction; (2) stride length estimation; (3) heading determination; and (4) sensor calibration. The MEMS sensors are calibrated when the PND is detected to be stationary. For example, accelerometers, gyroscopes, magnetic sensors, and pressure sensors all exhibit draft in bias and sensitivity that is time and temperature dependent. The bias for these sensors can be reset upon detection a stationary condition.

In another embodiment, the detection of a stationary state is used to constrain location uncertainty growth. Indoor position computation routines that rely on pedestrian DR, WiFi triangulation, and RSSI all have uncertainty variations that are dependent on the period of time since the last good position fix. With detection of a stationary state, the period of time since the last good position fix does not need to increase, resulting in extended availability of location solution with a desired level of accuracy lasting for a longer period of time. As a result, the uncertainty growth in computation of location is constrained.

In another embodiment, the detection of a stationary state is used to determine when to power off the PND, resulting in significant power savings.

According to one aspect of the invention, the frequency-domain method discussed above may also be used to extract motion parameters such as stride length, which may then be used within a pedestrian DR algorithm. Zero velocity measurement update (derived from stationary detection) can also be utilized by filters used to combine measurements from magnetic sensors and gyroscopes for determination of heading, pitch, and roll of the device.

The approaches described herein can be used in any type of PND, including those also used in vehicles, as well as cell phones, iPhones, PDAs, wrist watches or pendants with GPS functionality, handheld or laptop computers, and other type of device with built-in GPS functionality. Therefore, the configuration of the functions and the equipment can vary from implementation to implementation depending upon numerous factors, such as price constraints, performance requirements, technological improvements, or other circumstances.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for determining a current motion mode of a mobile device, the method comprising:
    collecting movement data from an inertial motion unit (IMU) of the mobile device;
    comparing, using a computer processor, the collected movement data to two or more sets of training data, each set of training data in the two or more sets of training data corresponding to a motion mode in a plurality of motion modes; and
    determining, based on the comparison, the current motion mode of the mobile device to be a particular motion mode in the plurality of motion modes.

2. The method of claim 1, wherein comparing the collected movement data to two or more sets of training data comprises:
    computing a set of linear predictor coefficients (LPC) for the collected movement data.

3. The method of claim 2, wherein comparing the collected movement data to two or more sets of training data further comprises:
    converting the LPC to linear spectral frequencies (LSF) for the collected movement data; and
    calculating a spectral distortion between the LSF for the collected movement data and a LSF for each set of training data in the two or more sets of training data.

4. The method of claim 3, wherein determining, based on the comparison, the current motion mode of the mobile device to be a particular motion mode in the plurality of motion modes comprises:
    determining the particular motion mode to be the motion mode whose corresponding set of training data has LSF that have a least amount of spectral distortion with the LSF of the collected movement data.

5. The method of claim 4, wherein:
    the LSF for a set of training data is a centroid of two or more individual LSFs, the two or more individual LSFs corresponding to training data collected for two or more different users.

6. The method of claim 2, wherein comparing the collected movement data to two or more sets of training data further comprises:
    calculating a spectral distortion between the LPC for the collected movement data and a LPC for each set of training data in the two or more sets of training data; and
    the LPC for a set of training data is a set of LPC for a centroid of two or more individual LSFs, the two or more individual LSFs corresponding to training data collected for two or more different users.

7. The method of claim 6, wherein determining, based on the comparison, the current motion mode of the mobile device to be a particular motion mode in the plurality of motion modes comprises:
    determining the particular motion mode to be the motion mode whose corresponding set of training data has LPC that have a least amount of spectral distortion with the LPC of the collected movement data.

8. The method of claim 1, wherein comparing the collected movement data to two or more sets of training data comprises:
    computing an absolute difference, the absolute difference being a difference between a maximum value of the collected movement data within a window and a minimum value of the collected movement data within the window; and
    comparing the absolute difference to one or more threshold values.

9. The method of claim 8, wherein determining, based on the comparison, the current motion mode of the mobile device to be a particular motion mode in the plurality of motion modes comprises:
    determining, based on the comparison of the absolute difference to the one or more threshold values, a bin to which the absolute difference corresponds; and
    determining the particular motion mode to be the motion mode that is associated with the bin.

10. The method of claim 9, wherein the one or more threshold values and associations between bins and motion modes are derived based on the two or more sets of training data.

11. The method of claim 10, further comprising:
computing a set of linear predictor coefficients (LPC) for the collected movement data;
converting the LPC to linear spectral frequencies (LSF) for the collected movement data;
calculating a spectral distortion between the LSF for the collected movement data and a LSF for each set of training data in the two or more sets of training data;
determining a frequency-mode motion mode to be the motion mode whose corresponding set of training data has LSF that have a least amount of spectral distortion with the LSF of the collected movement data; and
comparing the frequency-mode motion mode to the particular motion mode.

12. The method of claim 11, wherein comparing the frequency-mode motion mode to the particular motion mode comprises determining whether the frequency-mode motion mode is same as the particular motion mode.

13. The method of claim 1, wherein the plurality of motion modes includes two or more of: stationary, walking, fast walking, jogging, climbing up/down stairs, going up/down on an escalator, going up/down on an elevator, biking, driving, and riding in a vehicle.

14. The method of claim 1, wherein the current motion mode is used to select a dead-reckoning (DR) positioning algorithm.

15. The method of claim 1, wherein the plurality of motion modes includes a stationary motion mode, further comprising:
in response to determining the current motion mode to be the stationary motion mode, resetting a sensor of the IMU of the mobile device.

16. The method of claim 1, wherein the plurality of motion modes includes a stationary motion mode, further comprising:
in response to determining the current motion mode to be the stationary motion mode, constraining location uncertainty growth.

17. The method of claim 14, wherein constraining location uncertainty growth comprises not extending an amount of time since last good position fix while the current motion mode is the stationary motion mode.

18. The method of claim 1, wherein the plurality of motion modes includes a stationary motion mode, further comprising:
in response to determining the current motion mode to be the stationary motion mode, powering off the mobile device.

19. An apparatus that comprises circuitry that performs the method of claim 1.

20. An apparatus that comprises circuitry that performs the method of claim 6.

21. An apparatus that comprises circuitry that performs the method of claim 9.

22. An apparatus that comprises circuitry that performs the method of claim 12.

23. A location positioning apparatus for a mobile device, comprising:
an input coupled to receive movement data from an inertial motion unit (IMU) of the mobile device;
a storage containing two or more sets of training data, each set of training data in the two or more sets of training data corresponding to a motion mode in a plurality of motion modes; and
a processor that compares the received movement data to the training data and determines, based on the comparison, the current motion mode of the mobile device to be a particular motion mode in the plurality of motion modes.

24. The method of claim 1, wherein the sets of training data comprise respective sets of linear predictor coefficients (LPC), and wherein determining includes calculating a spectral distortion between the collected movement data and each of the sets of LPC.

25. The method of claim 1, wherein the sets of training data comprise respective sets of linear spectral frequencies (LSF), and wherein determining includes calculating a spectral distortion between the collected movement data and each of the sets of LSF.

26. The apparatus of claim 23, wherein the sets of training data comprise respective sets of linear predictor coefficients (LPC), and wherein the processor performs the determination by calculating a spectral distortion between the collected movement data and each of the sets of LPC.

27. The apparatus of claim 23, wherein the sets of training data comprise respective sets of linear spectral frequencies (LSF), and wherein the processor performs the determination by calculating a spectral distortion between the collected movement data and each of the sets of LSF.

* * * * *